(12) United States Patent
Bingle et al.

(10) Patent No.: US 6,832,793 B2
(45) Date of Patent: *Dec. 21, 2004

(54) SAFETY SYSTEM FOR OPENING THE TRUNK COMPARTMENT OF A VEHICLE

(75) Inventors: Robert L. Bingle, Holland, MI (US); Roger L. Koops, Hamilton, MI (US)

(73) Assignee: Donnelly Corporation, Holland, MI (US)

(*) Notice: Subject to any disclaimer, the term of this patent is extended or adjusted under 35 U.S.C. 154(b) by 56 days.

This patent is subject to a terminal disclaimer.

(21) Appl. No.: 10/263,538

(22) Filed: Oct. 3, 2002

(65) Prior Publication Data

US 2003/0035297 A1 Feb. 20, 2003

Related U.S. Application Data

(63) Continuation of application No. 09/852,483, filed on May 10, 2001, now Pat. No. 6,460,906, which is a continuation of application No. 09/605,233, filed on Jun. 28, 2000, now Pat. No. 6,254,261, which is a continuation of application No. 09/275,565, filed on Mar. 24, 1999, now Pat. No. 6,086,131.

(51) Int. Cl.[7] ............................................. E05B 3/00
(52) U.S. Cl. .................... 292/336.3; 292/347; 362/501; 296/76; 70/465; 180/271
(58) Field of Search ................................. 362/459, 487, 362/488, 501, 540, 542, 543–546, 109, 119, 154, 155, 362, 368, 375, 800, 188; 292/336.3, 347; 296/76; 280/14.27; 16/110.1, 412, 413, 903; 180/271; 70/57, 77, 91, 92, 101, 106, 237, 266, 465; 49/271

(56) References Cited

U.S. PATENT DOCUMENTS

| | | |
|---|---|---|
| 1,523,495 A | 1/1925 | Silberman .................. 362/501 |
| 1,629,456 A | 5/1927 | Pellegrini .................. 362/501 |
| 1,684,499 A | 9/1928 | Mayer ..................... 292/336.3 |
| 1,721,347 A | 7/1929 | Macrae et al. ............. 362/501 |
| 2,117,160 A | 5/1938 | Gale ....................... 292/336.3 |
| 2,360,227 A | 10/1944 | Hemphill ................... 362/464 |
| 2,688,865 A | 9/1954 | Foster et al. ................. 70/129 |
| 2,760,050 A | 8/1956 | Porsche .................... 362/501 |
| 3,016,968 A | 1/1962 | Lenz et al. .................. 180/82 |
| 3,209,563 A | 10/1965 | Pelcin ......................... 70/146 |
| 3,241,344 A | 3/1966 | Peters ........................ 70/279 |
| 3,553,448 A | 1/1971 | Davis et al. ................. 240/7.1 |

(List continued on next page.)

FOREIGN PATENT DOCUMENTS

| | | | |
|---|---|---|---|
| DE | 2636099 | 2/1978 | .......... B60R/25/10 |
| DE | 3732936 | 5/1989 | .......... B60R/25/10 |
| DE | 9006007 | 6/1991 | .......... B60R/25/10 |

(List continued on next page.)

OTHER PUBLICATIONS

Prosecution File for Reissue Application 09/344,384, filed Jun. 24, 1999, for Reissue of U.S. Patent 5,859,479 already of record.
"Kit 62 Movement Detector Components", Sep. 24, 1994 p. 1–5.
Securaplane Technologies Product Information.

*Primary Examiner*—Thomas M. Sember
*Assistant Examiner*—Ismael Negron
(74) *Attorney, Agent, or Firm*—Van Dyke, Gardner, Linn & Burkhart, LLP

(57) ABSTRACT

A safety system for opening a deck lid of a trunk compartment of vehicle includes a user operable device and a housing having an outer wall and a perimeter surface. The housing defines a recess therein, which is positioned below or behind a plane defined by the perimeter surface of the housing. The user operable device is positioned in the recess and below the plane defined by the perimeter surface such that the user operable device is actuable within the recess. The user operable to actuate the release mechanism to open the deck lid of the trunk compartment.

50 Claims, 3 Drawing Sheets

U.S. PATENT DOCUMENTS

| | | | |
|---|---|---|---|
| 3,582,639 A | 6/1971 | Chamberlain | 240/7.1 |
| 3,596,484 A | 8/1971 | Peters | 70/240 |
| 3,678,716 A | 7/1972 | Cobb | 70/92 |
| 3,759,556 A | 9/1973 | Wright | 292/33 |
| 3,766,539 A | 10/1973 | Bradshaw et al. | 340/258 |
| 3,829,693 A | 8/1974 | Schwarz | 250/338 |
| 3,839,640 A | 10/1974 | Rossin | 250/353 |
| 3,956,732 A | 5/1976 | Teich | 340/64 |
| 3,992,909 A | 11/1976 | McGhee | 70/379 R |
| 4,007,955 A | 2/1977 | Kobayashi | 292/216 |
| 4,052,716 A | 10/1977 | Mortensen | 340/233 |
| 4,080,812 A | 3/1978 | Knott | 70/256 |
| 4,122,371 A | 10/1978 | Talmage et al. | 362/464 |
| 4,127,966 A | 12/1978 | Schmidt | 49/141 |
| 4,155,233 A | 5/1979 | Lira | 70/92 |
| 4,166,955 A | 9/1979 | Keller | 250/342 |
| 4,242,669 A | 12/1980 | Crick | 340/567 |
| 4,312,197 A | 1/1982 | Carrion et al. | 70/135 |
| 4,318,089 A | 3/1982 | Frankel et al. | 340/567 |
| 4,322,959 A | 4/1982 | Mochida | 70/241 |
| 4,342,210 A | 8/1982 | Denningham | 70/278 |
| 4,365,232 A | 12/1982 | Miller | 362/464 |
| 4,371,205 A | 2/1983 | Kaveney, Jr. | 292/48 |
| 4,379,971 A | 4/1983 | Smith et al. | 250/342 |
| 4,384,207 A | 5/1983 | Doctor | 250/349 |
| 4,403,172 A | 9/1983 | Sasaki et al. | 315/77 |
| 4,418,335 A | 11/1983 | Genahr | 340/565 |
| 4,437,003 A | 3/1984 | Doctor | 250/338 |
| 4,441,023 A | 4/1984 | Doctor et al. | 250/338 |
| 4,464,649 A | 8/1984 | Her | 340/72 |
| 4,468,657 A | 8/1984 | Rossin | 340/555 |
| 4,482,179 A | 11/1984 | Johnson | 292/336.3 |
| 4,507,654 A | 3/1985 | Stolarczyk et al. | 340/545 |
| 4,546,417 A | 10/1985 | Watts | 362/84 |
| 4,556,796 A | 12/1985 | Renals | 250/338 |
| 4,604,524 A | 8/1986 | Kotlicki et al. | 250/342 |
| 4,612,442 A | 9/1986 | Toshimichi | 250/353 |
| 4,645,233 A | 2/1987 | Bruse et al. | 280/808 |
| 4,667,990 A | 5/1987 | Quantz | 292/201 |
| 4,697,081 A | 9/1987 | Baker | 250/338 |
| 4,704,533 A | 11/1987 | Rose et al. | 250/342 |
| 4,709,153 A | 11/1987 | Schofield | 250/353 |
| 4,745,284 A | 5/1988 | Masuda et al. | 250/338.3 |
| 4,746,910 A | 5/1988 | Pfister et al. | 340/567 |
| 4,752,768 A | 6/1988 | Steers et al. | 340/567 |
| 4,764,755 A | 8/1988 | Pedtke et al. | 340/541 |
| 4,775,347 A | 10/1988 | Takada et al. | 445/44 |
| 4,796,013 A | 1/1989 | Yasuda et al. | 340/562 |
| 4,797,657 A | 1/1989 | Vorzimmer et al. | 340/541 |
| 4,825,079 A | 4/1989 | Takamatsu et al. | 250/338.3 |
| 4,848,114 A | 7/1989 | Rippe | 70/263 |
| 4,848,509 A | 7/1989 | Bruhnke et al. | 180/297 |
| 4,857,912 A | 8/1989 | Everett, Jr. et al. | 340/825.3 |
| 4,868,390 A | 9/1989 | Keller et al. | 250/338.3 |
| 4,881,148 A | 11/1989 | Lambropoulos et al. | 361/172 |
| 4,895,009 A | 1/1990 | Kleefeldt et al. | 70/264 |
| 4,928,212 A | 5/1990 | Benavides | 362/501 |
| 4,930,864 A | 6/1990 | Kuster et al. | 350/167 |
| 4,933,668 A | 6/1990 | Oyer et al. | 340/541 |
| 4,952,808 A | 8/1990 | Turnbull et al. | 250/338.3 |
| 4,954,813 A | 9/1990 | August, Sr. et al. | 340/571 |
| 4,979,384 A | 12/1990 | Malesko et al. | 70/241 |
| 4,981,314 A | 1/1991 | Carr | 292/347 |
| 4,982,094 A | 1/1991 | Matsuda | 250/342 |
| 5,003,800 A | 4/1991 | Bublewicz | 70/264 |
| 5,027,104 A | 6/1991 | Reid | 340/541 |
| 5,030,012 A | 7/1991 | Hagins et al. | 374/31 |
| 5,045,702 A | 9/1991 | Mulleer | 250/342 |
| 5,054,686 A | 10/1991 | Chaung | 236/49.3 |
| 5,054,826 A | 10/1991 | Dow et al. | 292/125 |
| 5,063,371 A | 11/1991 | Oyer et al. | 340/541 |
| 5,071,160 A | 12/1991 | White et al. | 280/735 |
| 5,077,549 A | 12/1991 | Hershkovitz et al. | 340/567 |
| 5,084,696 A | 1/1992 | Guscott et al. | 340/541 |
| 5,093,656 A | 3/1992 | Dipoala | 340/522 |
| 5,166,679 A | 11/1992 | Vranish et al. | 340/870.37 |
| 5,174,643 A | 12/1992 | Priesemuth | 362/464 |
| 5,216,407 A | 6/1993 | Hwang | 340/426 |
| 5,219,413 A | 6/1993 | Lineberger | 180/272 |
| 5,231,359 A | 7/1993 | Masuda et al. | 324/675 |
| 5,283,551 A | 2/1994 | Guscott | 340/567 |
| 5,297,010 A | 3/1994 | Camarota et al. | 362/540 |
| 5,317,620 A | 5/1994 | Smith | 379/40 |
| 5,349,329 A | 9/1994 | Smith | 340/539 |
| 5,383,703 A | 1/1995 | Irvine, III | 296/181 |
| 5,404,128 A | 4/1995 | Ogino et al. | 340/425.5 |
| 5,406,171 A | 4/1995 | Moody | 362/464 |
| 5,409,273 A | 4/1995 | Claar et al. | 292/201 |
| 5,424,711 A | 6/1995 | Muller et al. | 340/426 |
| 5,424,712 A | 6/1995 | Rosenberger | 340/426 |
| 5,424,718 A | 6/1995 | Muller et al. | 340/567 |
| 5,445,326 A | 8/1995 | Ferro et al. | 292/336 |
| 5,482,314 A | 1/1996 | Corrado et al. | 280/735 |
| 5,486,810 A | 1/1996 | Schwarz | 340/521 |
| 5,512,836 A | 4/1996 | Chen et al. | 324/687 |
| 5,525,843 A | 6/1996 | Howing | 307/9.1 |
| 5,580,153 A | 12/1996 | Motz | 362/496 |
| 5,581,230 A | 12/1996 | Barrett | 362/501 |
| 5,585,625 A | 12/1996 | Spies | 250/221 |
| 5,636,536 A | 6/1997 | Kinnucan | 70/107 |
| 5,663,704 A | 9/1997 | Allen et al. | 340/426 |
| 5,693,943 A | 12/1997 | Tchernihovski et al. | 250/342 |
| 5,711,559 A | 1/1998 | Davis | 292/340 |
| 5,719,551 A | 2/1998 | Flick | 340/426 |
| 5,726,629 A | 3/1998 | Yu | 340/565 |
| 5,737,083 A | 4/1998 | Owechko et al. | 356/375 |
| 5,793,291 A | 8/1998 | Thornton | 340/573 |
| 5,802,479 A | 9/1998 | Kithil et al. | 701/45 |
| 5,805,056 A | 9/1998 | Mueller et al. | 340/426 |
| 5,848,802 A | 12/1998 | Breed et al. | 280/735 |
| 5,859,479 A | 1/1999 | David | 307/10.8 |
| 5,887,466 A | 3/1999 | Yoshizawa | 70/257 |
| 5,914,610 A | 6/1999 | Gershenfeld et al. | 324/663 |
| 5,933,090 A | 8/1999 | Christenson | 340/825.69 |
| 5,938,321 A | 8/1999 | Bos et al. | 362/494 |
| 5,949,340 A | 9/1999 | Rossi | 340/573.1 |
| 5,986,549 A | 11/1999 | Teodorescu | 340/561 |
| 6,018,292 A | 1/2000 | Penny, Jr. | 340/426 |
| 6,024,388 A | 2/2000 | Tomah et al. | 292/216 |
| 6,028,509 A | 2/2000 | Rice | 340/449 |
| 6,043,735 A | 3/2000 | Barrett | 340/436 |
| 6,051,981 A | 4/2000 | Gershenfeld et al. | 324/663 |
| 6,086,131 A * | 7/2000 | Bingle et al. | 362/501 |
| 6,091,322 A | 7/2000 | Ang et al. | 340/425.5 |
| 6,104,293 A | 8/2000 | Rossi | 340/573.1 |
| 6,130,614 A | 10/2000 | Miller et al. | 340/573.4 |
| 6,135,514 A | 10/2000 | Kowalewski et al. | 292/216 |
| 6,139,172 A | 10/2000 | Bos et al. | 362/494 |
| 6,158,788 A | 12/2000 | Ikeda et al. | 292/216 |
| 6,164,805 A | 12/2000 | Hulse | 362/501 |
| 6,166,625 A | 12/2000 | Teowee et al. | 340/426 |
| 6,208,241 B1 | 3/2001 | Barrett | 340/438 |
| 6,209,933 B1 | 4/2001 | Ang et al. | 296/76 |
| 6,222,442 B1 | 4/2001 | Gager et al. | 340/426 |
| 6,247,732 B1 | 6/2001 | Alton | 292/216 |
| 6,254,261 B1 * | 7/2001 | Bingle et al. | 362/501 |
| 6,275,146 B1 | 8/2001 | Kithil et al. | 340/425.5 |
| 6,335,687 B1 | 1/2002 | Terashima et al. | 340/573.1 |
| 6,339,376 B1 | 1/2002 | Okada | 340/562 |
| 6,349,984 B1 | 2/2002 | Marrazzo et al. | 292/336.3 |
| 6,369,395 B1 | 4/2002 | Roessler | 250/462.1 |

| | | | |
|---|---|---|---|
| 6,390,529 B1 | 5/2002 | Bingle et al. ................ 296/76 |
| 6,394,511 B1 | 5/2002 | Lam et al. ................ 292/336.3 |
| 6,402,357 B1 | 6/2002 | Myers ....................... 362/557 |
| 6,433,292 B1 | 8/2002 | Tate ........................... 200/512 |
| 6,460,906 B2 * | 10/2002 | Bingle et al. ............... 362/501 |
| 6,480,103 B1 | 11/2002 | McCarthy et al. ....... 340/425.5 |
| 6,485,081 B1 | 11/2002 | Bingle et al. ................. 296/76 |
| 2001/0030871 A1 | 10/2001 | Anderson, Jr. et al. ..... 362/488 |
| 2002/0003571 A1 | 1/2002 | Schofield et al. ........... 348/148 |
| 2002/0033609 A1 | 3/2002 | Baik ....................... 292/336.3 |
| 2002/0047279 A1 | 4/2002 | Byrla et al. .............. 292/336.3 |
| 2002/0063432 A1 | 5/2002 | Choi ....................... 292/336.3 |
| 2002/0080014 A1 | 6/2002 | McCarthy et al. .......... 340/426 |
| 2002/0135196 A1 | 9/2002 | Bingle et al. ................. 296/76 |

FOREIGN PATENT DOCUMENTS

| | | | |
|---|---|---|---|
| EP | 235372 A3 | 9/1987 | ........... G08B/13/18 |
| GB | 2252438 A | 8/1992 | ........... B60R/25/00 |
| GB | 2266799 A | 11/1993 | ........... G08B/13/00 |
| JP | 58188458 | 12/1983 | ........... E05B/65/19 |
| WO | WO 9813235 | 4/1998 | ........... B60R/25/10 |
| WO | WO9904119 | 1/1999 | ........... E05B/65/19 |

* cited by examiner

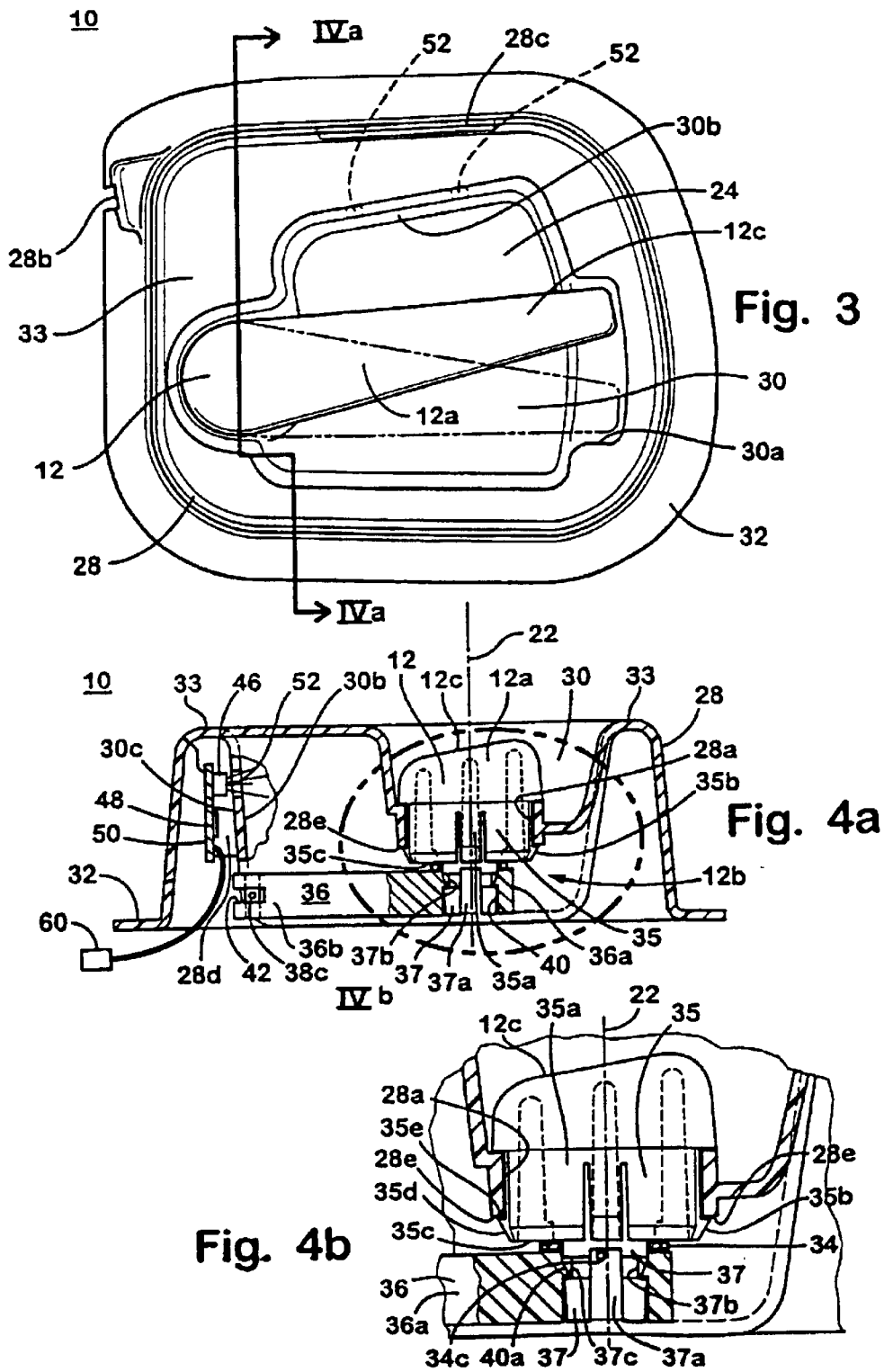

SAFETY SYSTEM FOR OPENING THE TRUNK COMPARTMENT OF A VEHICLE

This is a continuation of U.S. pat. application, Ser. No. 09/852,483, filed May 10, 2001 by DeLine et al. for SAFETY HANDLE FOR OPENING THE TRUNK OF A VEHICLE FROM INSIDE, now U.S. Pat. No. 6,460,906, which is a continuation of U.S. pat. application, Ser. No. 09/605,233, filed Jun. 28, 2000 by DeLine et al. for SAFETY HANDLE FOR TRUNK OF VEHICLE, now U.S. Pat. No. 6,254,261, which is a continuation of U.S. pat. application, Ser. No. 09/275,565, filed Mar. 24, 1999 by DeLine et al. for SAFETY HANDLE FOR TRUNK OF VEHICLE, now U.S. Pat. No. 6,086,131, which are hereby incorporated by reference herein in their entireties.

BACKGROUND OF THE INVENTION

This invention relates generally to a handle for opening a door to a compartment, and more particularly, a handle for opening a deck lid of a vehicle from inside the space enclosed by the deck lid.

Typically, the deck lid or door to trunk spaces are opened by a key being inserted and turned in a lock cylinder from a position exteriorly of the deck lid or by a button or lever that is positioned within the passenger compartment of the vehicle. While it has been suggested that a handle be placed in the interior of the trunk space, because of numerous difficulties, to date, vehicle manufacturers have not included a device specifically for opening the trunk from the inside of the trunk space. Even fold down rear seats, which are common in many vehicles today, cannot be folded down from within the trunk space. Although placement of a release mechanism in the trunk space has been suggested in the prior art, no commercially acceptable mechanism or device has been developed. Therefore, if a person is within the trunk space when the deck lid is closed, there is no way for a person to open the deck lid and get out of the trunk.

When the deck lid is closed, the space within the trunk is typically small and very dark. Although a light source is typically provided in a trunk to provide light to the trunk space when the trunk space is open, these lights are deactivated when the trunk is closed, in order to prevent excessive drain on the battery of the vehicle. Therefore, when a person is trapped within a trunk, it is nearly impossible to see anything within the trunk, such that even if a release mechanism were operable within the trunk, a person would not be able to find the mechanism after the deck lid had been closed. Furthermore, due to the cramped and tight space within a trunk, a person's movements to reach and operate a release mechanism are extremely restricted.

This inability to open a trunk of a vehicle from inside the trunk space has unfortunately lead to many injuries and even deaths over the years. When the deck lid is closed, the interior space of the trunk may reach extreme temperatures during the summer time, such that a person can only survive therein for a short period of time. Typically, these injuries and deaths occur to children, who enter the trunk to either play or hide and then trap themselves within the trunk by closing the deck lid.

Therefore, there is a need in the art for an interior trunk release mechanism which is highly visible under minimal lighting conditions such as when the deck lid of the trunk is closed. Furthermore, the release mechanism should be easily recognizable and operable even by children, and should avoid damage or deterioration of existing vehicle systems such as the battery or electrical system while remaining operable.

SUMMARY OF THE INVENTION

The present invention is intended to provide a mechanical apparatus for activating a release mechanism for a deck lid of a trunk of a vehicle from within the interior space of the trunk.

According to a first aspect of the present invention, an apparatus is adapted for use in opening a deck lid of a vehicle and is positionable within a compartment substantially enclosed by the deck lid. The apparatus comprises a handle for activating a release mechanism for opening the compartment which is of a bright color and in contrast to a background upon which it is installed. Preferably, the color is selected to convey a safe and friendly image to a child, such as a yellow or bright green color.

Preferably, the apparatus includes at least one illumination source which is at least occasionally activated to provide illumination of the handle, and a control circuit for at least temporarily activating the at least one illumination source when the deck lid is closed. The control circuit activates the at least one illumination source in response to an occurrence of an activating event.

In one form, the illumination source is at least one light emitting diode which provides either direct or indirect illumination to the handle of the present invention. The illumination source is temporarily activated upon closure of the deck lid and may be further activated upon a second activating event, such as movement of the handle or detection of a person or animal within the trunk space by a motion detector or temperature sensor or the like.

According to another aspect of the present invention, the apparatus includes a handle, an illumination source and a control circuit. The handle is interconnected to a release mechanism of the compartment and at least partially provides a mechanical advantage such that the release mechanism may be activated upon exertion of less than 20 Newtons in a predetermined direction on the handle. The illumination source provides illumination to the handle and is activated by the control circuit upon an occurrence of an activating event.

According to yet another aspect of the present invention, an apparatus is adapted for use in opening a compartment of a vehicle and is positionable within the compartment and substantially enclosed by a lid. The lid is openable by an electrically controlled latch. The apparatus is adapted to activate the latch in response to an activation of the apparatus.

In one form, the apparatus includes an electromechanical device which activates the latch when at least a portion of the device is moved. Preferably, the electromechanical device is a button and the activation is a pressing of the button.

Therefore, the present invention provides a trunk release apparatus which is easily recognizable and operable by a child, as children are the ones typically harmed by being trapped in a trunk. The release apparatus is easy to activate and is preferably a bright friendly color so as not to frighten or confuse a child who may be trapped within the trunk. Furthermore, an illumination source is preferably provided to increase the visibility of the release mechanism. The illumination source should only be activated for a limited period of time in order to prevent excessive drain on the battery of the vehicle.

These and other objects, advantages, purposes and features of this invention will become apparent upon review of the following specification in conjunction with the drawings.

BRIEF DESCRIPTION OF THE DRAWINGS

FIG. 3 is a front elevation of the housing and handle of the present invention;

FIG. 4a is a cross-sectional view taken substantially along line IVA—IVA in FIG. 3;

FIG. 4b is an enlarged view of the area labelled IVB in FIG. 4a;

DESCRIPTION OF THE PREFERRED EMBODIMENT

Figure 1:
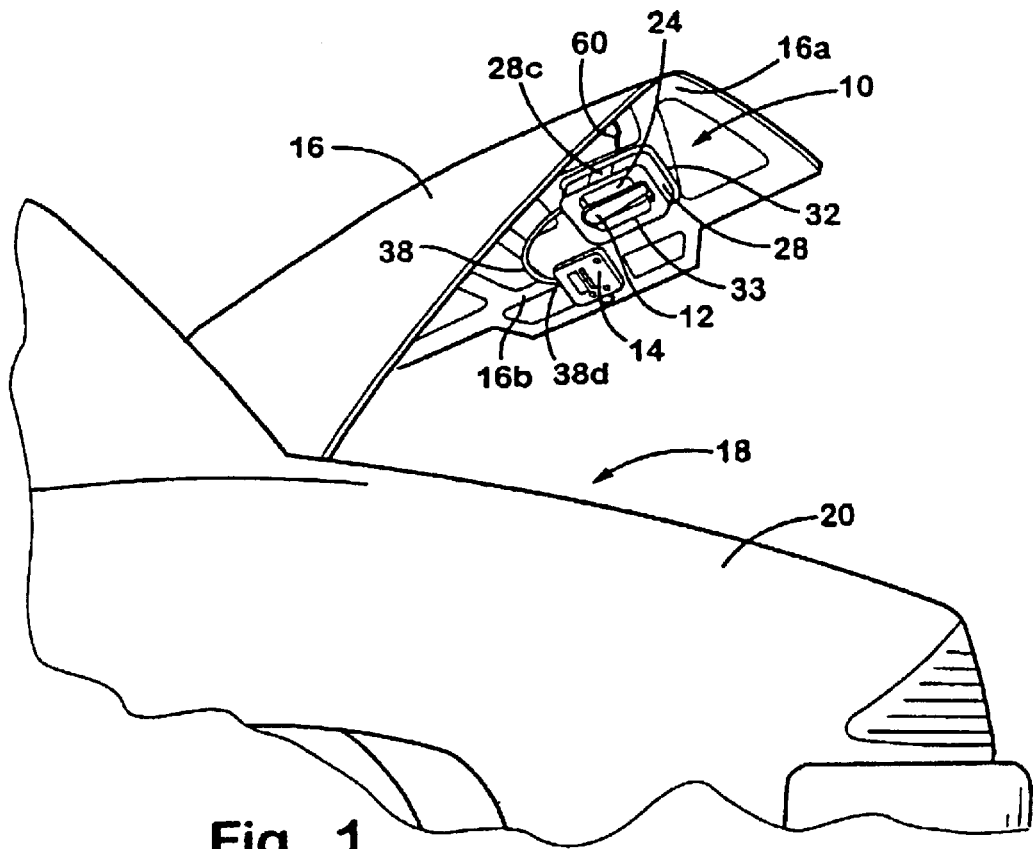
FIG. 1 is a perspective view of a deck lid of a vehicle incorporating the present invention.
Figure 2:
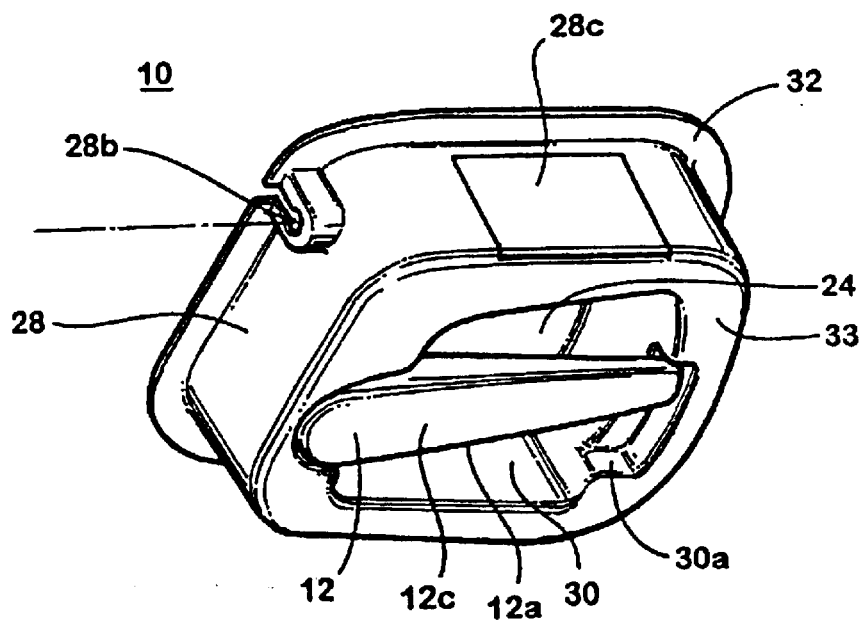
FIG. 2 is a front perspective view of the present invention prior to it being installed in the vehicle.

Referring now specifically to the drawings and the illustrative embodiments depicted therein, there is shown in FIG. 1 a safety release apparatus or assembly 10, which includes a handle 12 which is interconnected to a release mechanism 14 for opening a deck lid or trunk lid or door 16 of a trunk or storage compartment or space 18 of a vehicle 20. The vehicle 20 may be a sedan, coupe or even a hatchback or the like, which includes a trunk or storage compartment or space 18 substantially enclosed by a deck lid or door 16, such as a trunk or the like. Handle 12 of safety release apparatus 10 is interconnected with release mechanism 14 of deck lid 16 such that release mechanism 14 is activated, and deck lid 16 subsequently opened, in response to a movement of handle 12. Safety release apparatus 10 is mounted on an interior surface 16a of either the deck lid 16 or elsewhere within trunk space 18, so as to allow an operator of safety apparatus 10 to open the trunk from within trunk space 18. Most preferably, safety release apparatus 10 is mounted on a downward extending portion or waterfall 16b of deck lid 16, as shown in FIG. 1. However, clearly safety release apparatus 10 may be mounted elsewhere within trunk space 18 of vehicle 20, such as on a side wall of the trunk space or the like, without affecting the scope of the present invention.

Handle 12 of the present invention is preferably injection molded from a resinous polymeric material such as polycarbonate/PBT or polycarbonate/ABS or the like and includes a long handle portion 12a and a shaft portion 12b (FIG. 4a), which provides for a pivot axis 22 of handle 12. However, handle 12 may alternatively be a switch, push button or any other electromechanical device which may be electronically interconnected to an electronic latch mechanism, such that movement of at least a portion of the device releases the release mechanism in order to open the trunk. Handle 12 is designed and formed so as to be easily recognizable as an opening device for a door or the like, and further is formed with rounded edges along the handle portion 12a so as to make it a comfortable handle for a child or other occupant within the trunk to grasp and operate. Handle 12 may further include text or a picture on a facing surface 12c to convey to an operator of handle 12 that handle 12 is for opening the trunk. Furthermore, the color of handle 12 is selected to be a "friendly" color for children, so that any small child which may become trapped within trunk space 18 will not fear the handle as being something that is hot or otherwise harmful to touch. Preferably, the color selected is a bright green or yellow, which has been shown to convey a bright yet "friendly" or cool to touch appearance to the handle. It is important that the handle be child friendly so that even the smallest and youngest children who may be trapped within the trunk will not be afraid to operate the handle 12.

By providing a light color which does not convey an image of heat or otherwise harmful material, the handle 12 of the present invention is more likely to be grasped and operated by small children than a handle which may otherwise be of a "harmful" color, such as red or orange, which a child may believe is hot to touch. In order to make handle 12 more visible in minimum lighting conditions, handle 12 is also preferably mounted adjacent to a background 24 that is of a substantially darker color than handle 12, so as to provide a stark contrast between the handle and its background for better visibility of the handle in minimal lighting conditions. The background 24 may be a surface of a housing 28 for safety release assembly 10 or may be an interior surface of the trunk space 18 or deck lid 16 itself.

Safety release apparatus 10 preferably is installed within a housing 28, which is secured within trunk space 18 such that handle 12 is positioned within a recess 30 of housing 28. Housing 28 is preferably injection molded from a resinous polymeric material such as polycarbonate/PBT or polycarbonate/ABS or the like and may be black or another dark color. Housing 28 functions to protect handle 12 from being bumped or damaged by items which may be stored within trunk space 18 of vehicle 20. Not only does this prevent damage to handle 12 or other components of safety release apparatus 10, but housing 28 also substantially precludes the possibility of handle 12 being accidentally contacted and moved by the stored items so as to prevent unintentional opening of trunk space 18.

As best shown in FIGS. 2–4a, housing 28 includes a substantially flat and outward extending flange 32 along its rearward end and a raised, perimeter or front surface 33. Flange 32 allows for easy installation of the present invention, as fasteners or adhesive or the like may be inserted through or applied to flange 32 and then secured to an interior surface of either deck lid 16 or other interior surface of the trunk space 18 of the vehicle 20. Clearly, the safety release mechanism 10 may be installed on a vehicle during the assembly of the vehicle by the manufacturer, or may be installed later as an after market unit, without affecting the scope of the present invention.

Handle 12 is preferably positioned within recess 30 of housing 28 below or behind the plane of perimeter surface 33 such that the handle may pivot about its axis 22 within recess 30. Perimeter surface 33 helps protect handle 12 from stored items within trunk or compartment 18, and helps prevent accidental activation of handle 12. Recess 30 may also include at least one stop 30a, which limits rotational travel of handle 12 within a predetermined range. Preferably, as shown in FIGS. 4a and 4b, handle 12 includes a cylindrical bearing or barrel section 35 which has longitudinally extending sections 35a separated by slots which are generally parallel to the pivot axis 22 of handle 12. The slots allow the longitudinal sections 35a to flex inward as shaft 12b is inserted into opening 28a in housing 28. Barrel section 35 may also include a plurality of resilient, angled flange or tabs 35b formed at a free end 35c of longitudinal sections 35a and extending radially outwardly therefrom. Tabs 35b each have an inclined outer edge or surface 35d and a substantially flat, planar edge 35e extending generally perpendicular to axis 22 when handle 12 is mounted in opening 28a. As shaft 12b is inserted into opening 28a, the inclined surfaces 35d of tabs 35b engage the opening 28a and cam the sections 35a inwardly and guide insertion of barrel section 35 through opening 28a. As tabs 35b protrude through opening 28a, flat edges 35e engage an interior surface 28e of housing 28 adjacent opening 28a so as to snap fit handle 12 into housing 28. This allows handle 12 to be easily rotated within opening 28a, yet substantially precludes handle 12 from being pulled outward from opening 28a.

Additionally, a biasing member 34 such as a torisional spring or the like (FIG. 5), may be provided about shaft 12b of handle 12 in order to bias handle 12 in an initial position. Biasing member 34 preferably is positioned around a lower end 37 of handle shaft 12b, such that one end 34a of biasing member 34 engages a stop tab 34b on housing 28 and another end 34c engages a slot 37a along lower portion 37 of shaft 12b. This substantially fixes both ends 34a and 34c of biasing member 34 so that rotational movement of handle 12 about axis 22 winds the torisional spring, which then provides a rotational force on shaft 12b to return handle 12 to its initial position.

Figure 5:
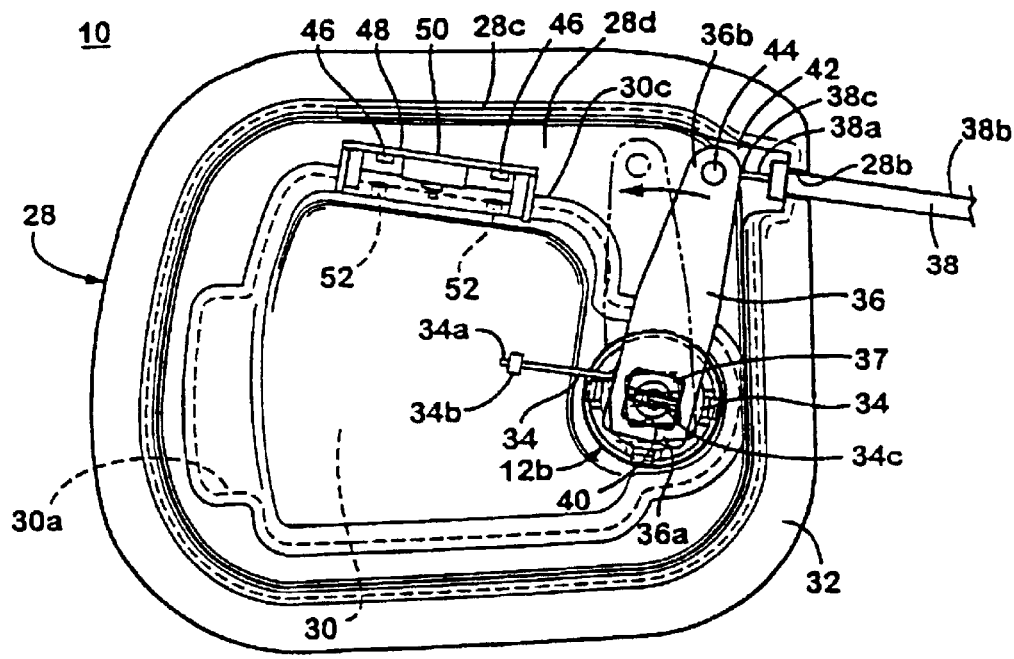
FIG. 5 is a rear elevation of the present invention.

Preferably, handle 12 is interconnected to release mechanism 14 by a lever 36 and a cable 38, as best shown in FIG. 5. The lever 36 is attached to lower portion 37 of shaft 12b, which extends downward from handle 12a through barrel section 35 and is of a lesser diameter than barrel section 35. Lower portion 37 is substantially non-circular at its free end and includes slot 37a extending longitudinally along its axis 22. Slot 37a allows lower portion 37 to flex inward for attachment of lever 36 thereto and further provides for the end 34c of biasing member 34, as discussed above. An annular groove 37b may also be included around lower portion 37 for securing lever 36 thereto.

As best shown in FIGS. 4a and 4b, lever 36 is preferably a substantially straight lever arm, which includes an opening 40 at one end 36a through which lower portion 37 of shaft 12b is inserted, such that lever 36 is fixedly secured to shaft 12b of handle 12. Lever 36 may include angled tabs 40a protruding inwardly at opening 40 to engage a corresponding lip 37c along groove 37b of shaft 12b, thereby snapping lever 36 onto lower portion 37 to prevent lever 36 from being removed from shaft 12b. Tabs 40a of lever 36 function similarly to tabs 35b of barrel section 35 as they engage lip 37c and prevent lever 36 from being removed from shaft 12b. As lower portion 37 of shaft 12b is inserted through opening 40 in lever 36, tabs 40a cam lower portion 37 inward, as slot 37a allows lower portion 37 to flex inwardly, until tabs 40a snap into groove 37b.

Preferably, both opening 40 and lower end 37 of shaft 12b are correspondingly substantially non-circular, such that lever 36 cannot rotate relative to shaft 12b. More preferably, opening 40 and lower shaft end 37 are substantially square as shown in FIG. 5. At a second end 36b of lever 36, there is located an attaching slot 42 or the like, which may be secured to cable 38. As shown in FIGS. 4 and 5, an underside of housing 28 provides for a cavity in which lever 36 is also substantially encased, again to prevent damage to the lever and to further prevent accidental activation of the release mechanism 14.

Cable 38 preferably comprises an inner cable 38a and an outer sheath 38b through which inner cable 38a may travel. At each end 38c and 38d of inner cable 38a is a pin 44 for engaging a corresponding slot or other attaching means. Pin 44 on a first end 38c of inner cable 38a is secured to slot 42 on lever 36 while pin 44 on a second end 38d of inner cable 38a is likewise secured to a slot (not shown) on release mechanism 14. Outer sheath 38b of cable 38 is secured to housing 28 through a cable opening 28b in one side and to a bracket (not shown) substantially adjacent release mechanism 14. Movement of first end 38c of inner cable 38a therefore results in a substantially similar amount of travel of second end 38d of inner cable 38a, while cable 38 is maintained by sheath 38b in a predetermined path between housing 28 and release mechanism 14.

When handle 12a is grasped and pivoted about its pivot axis 22, lever 36 is correspondingly pivoted about the same axis 22. As shown in FIG. 5, this results in second end 36b of lever 36 traveling along an arcuate path which causes a linear travel of substantially the same distance to occur to first end 38c of inner cable 38a. As first end 38c travels along the arcuate path, second end 38d of inner cable likewise is moved a linear distance substantially equal to the linear travel of first end 38c. Safety release assembly 10 is designed such that pivoting handle 12a until handle 12a is approximately at stop 30a in recess 30 results in a predetermined amount of cable travel in cable 38 so as to activate release mechanism 14, thereby opening deck lid 16 of vehicle 20. Preferably, this pivot requirement is less than approximately a 15 degree rotation of handle 12. Although shown and described as including a lever and cable to activate release mechanism 14, clearly the present invention may incorporate other mechanical means for interconnecting the handle 12 to the release mechanism 14, without affecting the scope of the present invention. For example, second end 36b of lever 36 may be directly connected to release mechanism 14 or to another form of linkage, such as an additional lever arm or the like.

Although safety release assembly 10 is shown and described as including a handle, lever and cable system, it is envisioned that other means of activating a release latch or mechanism may be implemented. For example, for a vehicle including an electronically operated latch, the safety release assembly may include an electro-mechanical device for signaling or activating the latch and thus opening the deck lid. The electro-mechanical device may be a push button, handle or switch positioned within the trunk space and electronically interconnected with the latch mechanism, such that activation or movement of the device energizes a solenoid within the latch mechanism or otherwise causes the latch mechanism to release, thereby opening the trunk. The device may be a bright color and may be easily recognized and operated by a small child in accordance with the present invention as discussed above.

Preferably, safety release assembly 10 further includes at least one illumination source 46 for providing illumination to handle 12, and an electronic control circuit 48 for at least temporarily activating the illumination source 46 in response to at least one activating event, as discussed below. The illumination provided by illumination source 46 allows a person who may be trapped within trunk space 18 to see handle 12 so as to grasp the handle and open the trunk, as the trunk space would otherwise be too dark for a person to see where the handle is located. This is especially critical when a child is trapped in the trunk, as a child would not even know to look for such a handle, much less know where the handle may be positioned within the trunk. Most preferably, the light emitted by illumination source 46 will be of low intensity and a "friendly" color to avoid frightening a child, who may believe that the handle is hot if it is illuminated by a bright light or the like.

Illumination source 46 is thus provided to illuminate handle 12 when the deck lid 16 of vehicle 20 is closed, as the trunk space 18 becomes very dark when fully enclosed. Preferably, illumination source 46 is at least one light emitting diode (LED) or other non-incandescent illumination source (such as organic or inorganic electroluminescent sources, phosphorescent sources, etc.), as these types of illumination sources minimize the drain on the vehicle battery when they are activated, as well as being highly durable and long-lasting. The LEDs may be selected to provide illumination in a preferred color, such as green or yellow, and may be selected to draw a minimal amount of current from the vehicle battery or the like. Preferably, an LED is selected which draws less than about 45 milliamps when activated, and more preferably, the LED draws less than or equal to about 30 milliamps when activated. Such LEDs are commercially available, examples being a Hyper-Bright LED manufactured by Siemens or other LEDs manufactured by Hewlett-Packard. Most preferably, illumination source 46 is at least two LEDs, so that if one fails for some unforeseen reason, there is still at least one additional LED providing illumination to handle 12. Although illumination source 46 is shown and described as an LED or the like, clearly other illumination sources may be provided in varying locations within the trunk without affecting the scope of the present invention. For example, illumination source 46 may be within handle portion 12a of handle 12 itself, to provide direct illumination of handle 12. Furthermore, illumination source 46 may be provided by handle 12 being made out of a highly visible and glowing phosphorus material or the like. Alternatively, illumination source 46 may be an incandescent source, such as a filament lamp, a halogen lamp, a neon lamp, or the like. Preferably, illumination source 46 may also serve as the standard trunk light, which is normally activated when the trunk or deck lid is opened, thereby providing light to the entire trunk space when the trunk is closed.

As shown in FIGS. 4a and 5, illumination source 46 is most preferably located on a circuit board or chip 50 containing control circuit 48, and is substantially encased along with control circuit 48 within housing 28 in order to prevent damage to illumination source 46 or control circuit 48 by items stored within the trunk. Illumination source 46 may project light through at least one slot or opening 52 in a side wall 30b of recess 30 such that illumination source 46 is directed toward handle portion 12a of handle 12. Handle portion 12a may also be twisted or angled such that the facing surface 12c of handle portion 12a is angled toward illumination source 46 in order to receive and reflect illumination from illumination source 46 over a greater surface area. A removable access panel 28c (FIG. 2) may also be included on housing 28 to provide for easy access for installation and maintenance of both control circuit 48 and illumination source 46 within a cavity 28d formed by housing 28. Preferably, control circuit 48 is snap fit onto an interior side 30c of side wall 30b such that illumination source 46 is aligned with slot 52. Control circuit 48 further includes a wiring harness and connector 60 for connecting control circuit 48 to a power source located on vehicle 20, such as the vehicle battery or the like.

Figure 6:
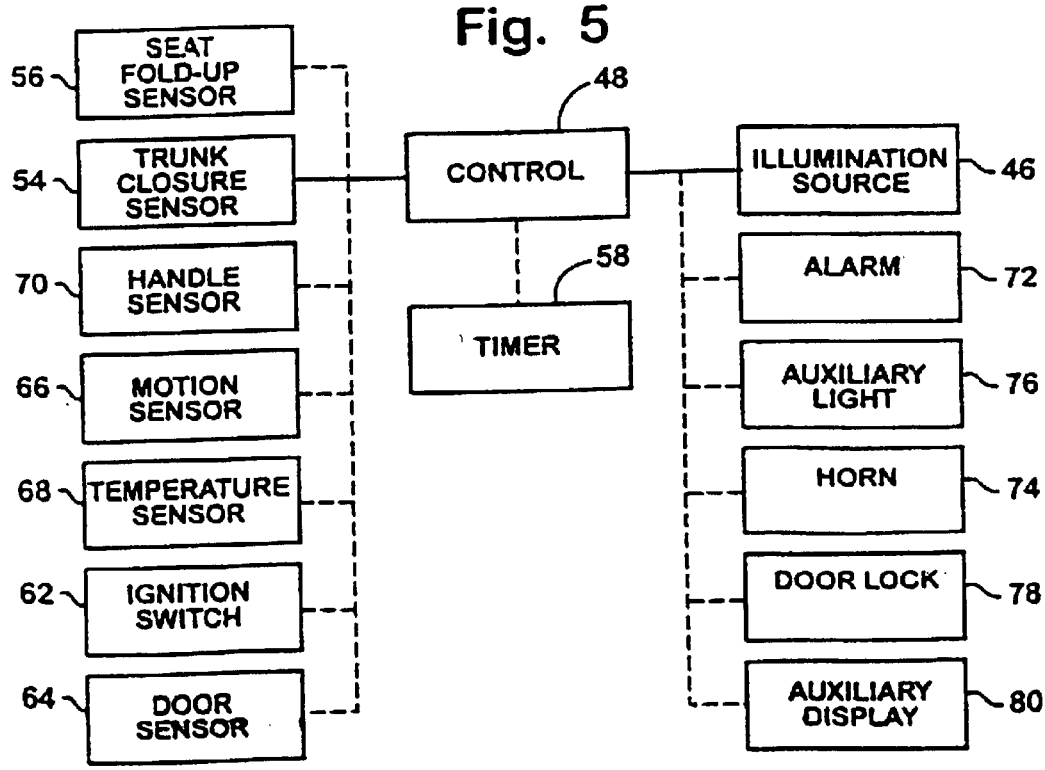
FIG. 6 is a block diagram of the control circuit of the present invention.

Control circuit 48 functions to activate illumination source 46 upon an occurrence of an activating event. The activating event may be the closing of deck lid 16 and/or the closing or folding back of any fold-down rear seats which may be present in vehicle 20. For example, as shown in FIG. 6, vehicle 20 may include a trunk closure sensor 54 and/or a seat sensor 56 to provide a signal to control circuit 48 when the trunk is closed or the seats are folded to their upright position, thereby enclosing trunk space 18. Preferably, control circuit 48 also functions to deactivate illumination source 46 after a period of time following the activating event. For example, control circuit 48 may include a timer or other timing mechanism 58 which triggers deactivation of illumination source 46 after a predetermined period of time, such as thirty minutes or an hour, has elapsed following the initial activation of illumination source 46. Control circuit 48 continues to reset and reactivate illumination source 46 upon subsequent occurrences of one or more activating events, following deactivation of illumination source 46 after the predetermined period of time has elapsed.

Referring to FIG. 6, control circuit 48 may also activate illumination source 46 in response to additional activating events, such as an ignition switch 62 of vehicle 20 being activated, a door sensor 64 signaling that a door of vehicle 20 is being opened or closed or other functions of vehicle 20 which pertain to the entering or leaving of vehicle 20 or movement of the vehicle. Safety release assembly 10 may further include a motion detector or sensor 66 (such as a pyro detector, preferably a low current pyro detector) and/or a temperature sensor 68 such as a bolometer within trunk space 18, so as to provide a signal to control circuit 48 when a movement or predetermined temperature of an object in trunk space 18 is detected. The present invention may also include a handle sensor 70 which detects movement of handle 12 to provide an additional signal to control circuit 48. Control circuit 48 may then, in response to a signal from the motion detector 66, the temperature sensor 68, or the handle sensor 70, activate illumination source 46 to provide illumination of handle 12 in trunk space 18. Furthermore, in response to such signals, which convey a message that a person or animal may be entrapped within trunk space 18, control circuit 48 may activate other additional auxiliary signals or displays. For example, control circuit 48 may activate an alarm 72, a horn 74, an auxiliary light 76 elsewhere on vehicle 20, a door or trunk lock or lock release 78 of vehicle 20, an auxiliary message display 80, which may be within vehicle 20 or remote from the vehicle, or the like, in order to provide an operator or anyone else within the vicinity of vehicle 20 information pertaining to a person or animal being entrapped within the trunk space 18 of the vehicle. The alarm 72, auxiliary light 76, horn 74, message display 80, lock system 78 or the like may be activated upon a first detection of motion or temperature within trunk space 18, or may alternatively be activated upon a second, third, or fourth occurrence of such detections. The number of detections required prior to an alarm or the like being activated by control circuit 48 are preferably reset following an opening and closing of deck lid 16 or a folding down of a rear seat within vehicle 20, if applicable.

When installed in the vehicle, the present invention therefore provides for illumination source 46 to be activated for a period of time following closure of the trunk and/or a folding of rear seats of vehicle 20. While the illumination source 46 is activated, a child or other person that may be entrapped within trunk space 18 will be able to easily see and identify handle 12. Because it is difficult for a person to move about within the small trunk space of a typical vehicle, and because typically it is a very small child that may be entrapped therein, the present invention also provides a handle 12 which is very easily pivoted about its axis so as to open deck lid 16 of vehicle 20. Preferably, handle 12, lever 36 and cable 38 cooperate to allow release mechanism 14 of deck lid 16 to be opened with only a minimal amount of force being applied to handle portion 12a. The force required to pivot handle 12 about its pivot axis 22, thereby activating release mechanism 14 of deck lid 16, is preferably less than or equal to about 20 Newtons applied in a direction substantially perpendicular to the handle portion 12a. More preferably, the force required to open deck lid 16 is less than or equal to about 15 Newtons and most preferably, the force required is less than or equal to about 10 Newtons. A person who is trapped within trunk space 18, upon identifying the handle 12 as a means in which to open the trunk of the vehicle, merely grasps the handle and easily pivots the handle, which subsequently activates release mechanism 14 of vehicle 20 as discussed above. Once release mechanism 14 is activated, the trunk may be easily pushed open so as to allow the person to get out of the trunk.

An alternate embodiment of the present invention provides for a module, which includes a handle, illumination source, control circuit, and housing similar to those discussed above, and further includes a license plate holder and lock cylinder for the deck lid which are positioned on an exterior surface of the deck lid. This embodiment may also include an exterior handle such that the trunk may be opened from outside without having to insert a key within the lock cylinder or otherwise enter the vehicle to release the trunk release lever from within the vehicle. The module is installed through an opening in the trunk lid and preferably includes a lock cylinder and release mechanism for opening the trunk.

Therefore, the present invention provides a safety release apparatus for opening a deck lid or trunk of a vehicle from inside the trunk space. The apparatus of the present invention is easy to install in the vehicle, and is easily recognized and operated by a small child that may become trapped within the trunk of the vehicle. The color and intensity of the handles and illumination are selected to convey a friendly, non-hot appearance to the handle, such that a child will easily see the handle and not be afraid to grasp the handle in order to open the trunk. Furthermore, the control circuit of the present invention activates the illumination source or other auxiliary signal in response to an activating event and deactivates the illumination source after a period of time in order to minimize the overall drain on the vehicle battery. The illumination source is also selected to be a non-incandescent device, such as an LED or the like, which is highly durable and long lasting, yet requires a minimal amount of energy from the battery of the vehicle, even while it is activated. Although the illumination source and control circuit of the present invention require connection to an electrical power source in order to provide illumination to the handle of the present invention, no electrical power is required to operate the handle and thus release the release mechanism in order to open the trunk of the vehicle. The handle, lever, cable and release mechanism are all mechanical devices, such that the trunk may be opened even when there is a power loss to the vehicle itself. Furthermore, even if power is lost to the vehicle, the color of the handle is preferably selected to be a light bright color, and starkly contrasts the background on which the handle is installed so as to remain visible in very low light conditions.

Changes and modifications in the specifically described embodiments can be carried out without departing from the principles of the invention, which is intended to be limited only by the scope of the pending claims, as interpreted to the principles of patent law.

What is claimed is:

1. A safety trunk release system for opening a deck lid of a trunk compartment of a vehicle, said safety trunk release system comprising:

a release mechanism for opening the deck lid;

a housing disposed in the trunk compartment, said housing having an outer wall and a perimeter surface, said housing defining a recess positioned below or behind a plane defined by said perimeter surface of said housing; and a user operable device positioned in said recess of said housing, whereby said user operable device is positioned below said plane defined by said perimeter surface such that said user operable device is actuatable within said recess, said user operable device being operable to actuate said release mechanism to open the deck lid of the trunk compartment in response to a user input to said user operable device.

2. The safety trunk release system of claim 1, wherein said user operable device is mechanically connected to said release mechanism such that actuation of said user operable device causes a corresponding mechanical movement at said release mechanism.

3. The safety trunk release system of claim 1, wherein actuation of said user operable device causes an electrical actuation of said release mechanism.

4. The safety trunk release system of claim 1, wherein said user operable device comprises one of a push button, a handle and a switch.

5. The safety trunk release system of claim 1, wherein said user operable device includes at least one of text and a picture on a surface of said user operable device facing outwardly from said recess.

6. The safety trunk release system of claim 1, wherein said user operable device is operable to actuate said release mechanism via an electromechanical device.

7. The safety trunk release system of claim 6, wherein said electromechanical device comprises a solenoid which is energizable to actuate said release mechanism in response to actuation of said user operable device.

8. The safety trunk release system of claim 1, wherein said user operable device comprises an electromechanical device such that movement of at least a portion of said user operable device actuates said release mechanism.

9. The safety trunk release system of claim 8, wherein said user operable device is operable to electronically actuate said release mechanism, said release mechanism comprising an electromechanical release mechanism.

10. The safety trunk release system of claim 1 including an illumination device positioned at said housing and operable to at least partially illuminate said user operable device.

11. The safety trunk release system of claim 10, wherein said illumination device comprises at least one light emitting diode.

12. The safety trunk release system of claim 10, wherein said illumination device comprises a phosphorescent material.

13. The safety trunk release system of claim 10, wherein said illumination device is automatically actuatable in response to an activating event and deactivatable a period of time following said activating event.

14. The safety trunk release system of claim 13, wherein said activating event comprises at least one of a closing of the deck lid, a closing or folding of a rear seat of the vehicle, an opening or closing of a door of the vehicle, actuation of an ignition switch of the vehicle, a detection of movement within the trunk compartment, and a detection of an occupant within the trunk compartment.

15. The safety trunk release system of claim 1, wherein said housing comprises at least one mounting element configured for securing said housing to an interior surface of the trunk compartment.

16. The safety trunk release system of claim 15, wherein said perimeter surface is at an opposite portion of said outer wall from said at least one mounting element.

17. The safety trunk release system of claim 16, wherein said at least one mounting element comprises a mounting flange extending outwardly around at least a portion of a perimeter of said outer wall of said housing.

18. The safety trunk release system of claim 15, wherein said at least one mounting element is mountable to an interior surface of the deck lid.

19. The safety trunk release system of claim 18, wherein said at least one mounting element is mountable to an interior surface of a downward extending portion of the deck lid.

20. A safety trunk release system for opening a deck lid of a trunk compartment of a vehicle, said safety trunk release system comprising:

an electromechanically actuatable release mechanism for opening the deck lid;

a housing disposed in the trunk compartment, said housing having an outer wall and a perimeter surface, said housing defining a recess positioned below or behind a plane defined by said perimeter surface of said housing;

a user operable device positioned in said recess of said housing below said plane defined by said perimeter surface such that said user operable device is actuatable within said recess, said user operable device being operable to actuate said release mechanism to open the deck lid of the trunk compartment, said user operable device comprising an electromechanical device such that movement of at least a portion of said user operable device actuates said release mechanism; and an illumination source operable to at least partially illuminate said user operable device.

21. The safety trunk release system of claim 20, wherein actuation of said user operable device causes electrical actuation of said release mechanism.

22. The safety trunk release system of claim 20, wherein said user operable device comprises one of a push button, a handle and a switch.

23. The safety trunk release system of claim 20, wherein said illumination device comprises at least one light emitting diode.

24. The safety trunk release system of claim 20, wherein said illumination device comprises a phosphorescent material.

25. The safety trunk release system of claim 20, wherein said illumination device is positioned at said housing.

26. The safety trunk release system of claim 20, wherein said user operable device includes at least one of text and a picture on a surface of said user operable device facing outwardly from said recess.

27. The safety trunk release system of claim 20, wherein said user operable device is operable to actuate said release mechanism via an electromechanical device.

28. The safety trunk release system of claim 27, wherein said electromechanical device comprises a solenoid which is energizable to actuate said release mechanism in response to actuation of said user operable device.

29. The safety trunk release system of claim 20, wherein said illumination device is automatically actuatable in response to an activating event and deactivatable a period of time following said activating event.

30. The safety trunk release system of claim 29, wherein said activating event comprises at least one of a closing of the deck lid, a closing or folding of a rear seat of the vehicle, an opening or closing of a door of the vehicle, actuation of an ignition switch of the vehicle, a detection of movement within the trunk compartment, and a detection of an occupant within the trunk compartment.

31. The safety trunk release system of claim 20, wherein said housing comprises at least one mounting element configured for securing said housing to an interior surface of the trunk compartment.

32. The safety trunk release system of claim 31, wherein said perimeter surface is at an opposite portion of said outer wall from said at least one mounting element.

33. The safety trunk release system of claim 32, wherein said at least one mounting element comprises a mounting flange extending outwardly around at least a portion of a perimeter of said outer wall of said housing.

34. The safety trunk release system of claim 31, wherein said at least one mounting element is mountable to an interior surface of the deck lid.

35. The safety trunk release system of claim 34, wherein said at least one mounting element is mountable to an interior surface of a downward extending portion of the deck lid.

36. A safety trunk release system for opening a deck lid of a trunk compartment of a vehicle, said safety trunk release system comprising:

a release mechanism for opening the deck lid;

a housing disposed within the trunk compartment, said housing having an outer wall and a perimeter surface, said housing defining a recess positioned below or behind a plane defined by said perimeter surface of said housing;

a user operable device positioned in said recess of said housing below said plane defined by said perimeter surface such that said user operable device is actuatable within said recess, said user operable device being operable to electronically actuate said release mechanism to open the deck lid of the trunk compartment in response to a user input to said user operable device; and an illumination device positioned at said housing and operable to at least partially illuminate said user operable device, said illumination device being automatically actuatable in response to an activating event and deactivatable a period of time following said activating event.

37. The safety trunk release system of claim 36, wherein said user operable device comprises one of a push button, a handle and a switch.

38. The safety trunk release system of claim 36, wherein said activating event comprises at least one of a closing of the deck lid, a closing or folding of a rear seat of the vehicle, an opening or closing of a door of the vehicle, actuation of an ignition switch of the vehicle, a detection of movement within the trunk compartment, and a detection of an occupant within the trunk compartment.

39. The safety trunk release system of claim 36, wherein said user operable device includes at least one of text and a picture on a surface of said user operable device facing outwardly from said recess.

40. The safety trunk release system of claim 36, wherein said illumination device comprises at least one light emitting diode.

41. The safety trunk release system of claim 36, wherein said illumination device comprises a phosphorescent material.

42. The safety trunk release system of claim 36, wherein said release mechanism comprises an electromechanical device.

43. The safety trunk release system of claim 42, wherein said electromechanical device comprises a solenoid which is energizable to open the deck lid in response to actuation of said user operable device.

44. The safety trunk release system of claim 36, wherein said user operable device comprises an electromechanical device, such that movement of at least a portion of said user operable device electronically actuates said release mechanism.

45. The safety trunk release system of claim 44, wherein said release mechanism comprises an electromechanical release mechanism.

46. The safety trunk release system of claim 36, wherein said housing comprises at least one mounting element configured for securing said housing to an interior surface of the trunk compartment.

47. The safety trunk release system of claim 46, wherein said perimeter surface is at an opposite portion of said outer wall from said at least one mounting element.

48. The safety trunk release system of claim 47, wherein said at least one mounting element comprises a mounting flange extending outwardly around at least a portion of a perimeter of said outer wall of said housing.

49. The safety trunk release system of claim 46, wherein said at least one mounting element is mountable to an interior surface of the deck lid.

50. The safety trunk release system of claim 49, wherein said at least one mounting element is mountable to an interior surface of a downward extending portion of the deck lid.

* * * * *

UNITED STATES PATENT AND TRADEMARK OFFICE
CERTIFICATE OF CORRECTION

PATENT NO. : 6,832,793 B2  Page 1 of 1
APPLICATION NO. : 10/263538
DATED : December 21, 2004
INVENTOR(S) : Robert L. Bingle and Roger L. Koops It is certified that error appears in the above-identified patent and that said Letters Patent is hereby corrected as shown below:

On the title page item (57) ABSTRACT:
Line 2, Insert --a-- before "vehicle".
Line 8, "actuable" should be --actuatable--.
Line 9, Insert --device is operable-- after "operable".

Signed and Sealed this

Twenty-seventh Day of February, 2007

JON W. DUDAS
*Director of the United States Patent and Trademark Office*